(12) United States Patent  
Woodhouse et al.

(10) Patent No.: US 7,399,027 B2  
(45) Date of Patent: Jul. 15, 2008

(54) AUTOMOTIVE FRONT END FASCIA WITH INTEGRATED STRUCTURAL MEMBER

(75) Inventors: David Woodhouse, Newport Coast, CA (US); Tyler Blake, Rancho Santa Margarita, CA (US); Freeman Thomas, Laguna Beach, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 11/327,114

(22) Filed: Jan. 6, 2006

(65) Prior Publication Data

US 2007/0158962 A1    Jul. 12, 2007

(51) Int. Cl.  
*B60R 27/00* (2006.01)

(52) U.S. Cl. .............................. 296/193.1; 296/203.02; 293/115

(58) Field of Classification Search ................. 296/194, 296/203.02, 193.1; 293/115, 155, 156  
See application file for complete search history.

(56) References Cited

U.S. PATENT DOCUMENTS

| 6,308,999 | B1* | 10/2001 | Tan et al. ..................... 293/109 |
| 6,312,028 | B1* | 11/2001 | Wilkosz ...................... 293/133 |
| 6,357,821 | B1* | 3/2002 | Maj et al. .............. 296/193.09 |
| D460,933 | S * | 7/2002 | Newton ..................... D12/163 |
| 6,663,151 | B2 | 12/2003 | Mansoor et al. |
| 6,712,410 | B2 | 3/2004 | Kudelko et al. |
| 2003/0067178 | A1 | 4/2003 | Bastien et al. |
| 2003/0067179 | A1 | 4/2003 | Bastien et al. |
| 2005/0167998 | A1* | 8/2005 | Pleet et al. .................. 293/115 |
| 2007/0176441 | A1* | 8/2007 | Lau et al. .................... 293/115 |

* cited by examiner

*Primary Examiner*—Lori L Lyjak  
(74) *Attorney, Agent, or Firm*—Frank A. MacKenzie; Brooks Kushman P.C.

(57) ABSTRACT

An automotive vehicle is disclosed with a vehicle body, an ornamental fascia mounted to a front end of the vehicle body and a structural member mounted to the vehicle body front end. The structural member extends through the ornamental fascia to an exterior side of the vehicle body for a compact arrangement of structural, functional and design characteristics of the vehicle front end.

19 Claims, 3 Drawing Sheets

AUTOMOTIVE FRONT END FASCIA WITH INTEGRATED STRUCTURAL MEMBER

BACKGROUND OF THE INVENTION

1. Field of the Invention

The invention relates to automotive front ends, more particularly to automotive front end fascias and automotive front end structural members.

2. Background Art

Automotive vehicles often utilize a structural member on a front end of the vehicle, such as a bumper, for protecting the vehicle and operational components of the vehicle from front end impacts.

Automotive vehicle front ends often utilize an air intake for receiving ambient air into the vehicle system for utilization of operation of the vehicle, including cooling of the vehicle, climate control of the vehicle and for mixture with fuel for a propulsion device of the vehicle, such as an internal combustion engine.

A front end of a vehicle is a prominent end of the vehicle, which is commonly associated with the styling and identity of a vehicle. Accordingly, front end fascias are often utilized for incorporating styling, design and structure of the vehicle. Often, the fascia is integrated with an air intake and encloses the structural member for concealing the structural member from an external ornamental appearance of the vehicle.

SUMMARY OF THE INVENTION

An embodiment of the present invention provides an automotive vehicle having a vehicle body, an ornamental fascia provided on a front end of the vehicle body, and a structural member mounted to the vehicle body front end. The structural member extends through the ornamental fascia to an exterior side of the vehicle body.

Another embodiment of the present invention provides an automotive vehicle having a vehicle body with a front end, and a grille mounted to the vehicle body front end. The grille is provided with an air intake for receiving air for the vehicle. A structural bumper is mounted to the vehicle front end and extends through the grille air intake.

Yet another embodiment of the present invention provides an automotive vehicle with a vehicle body having a front end. An ornamental fascia is provided on the front end of the vehicle body. A structural member is mounted to the vehicle body front end and is displaced at least partially external of the fascia and is incorporated into an ornamental exterior of the fascia.

The above embodiments, and other embodiments, aspects, objects, features, and advantages of the present invention are readily apparent from the following detailed description of embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
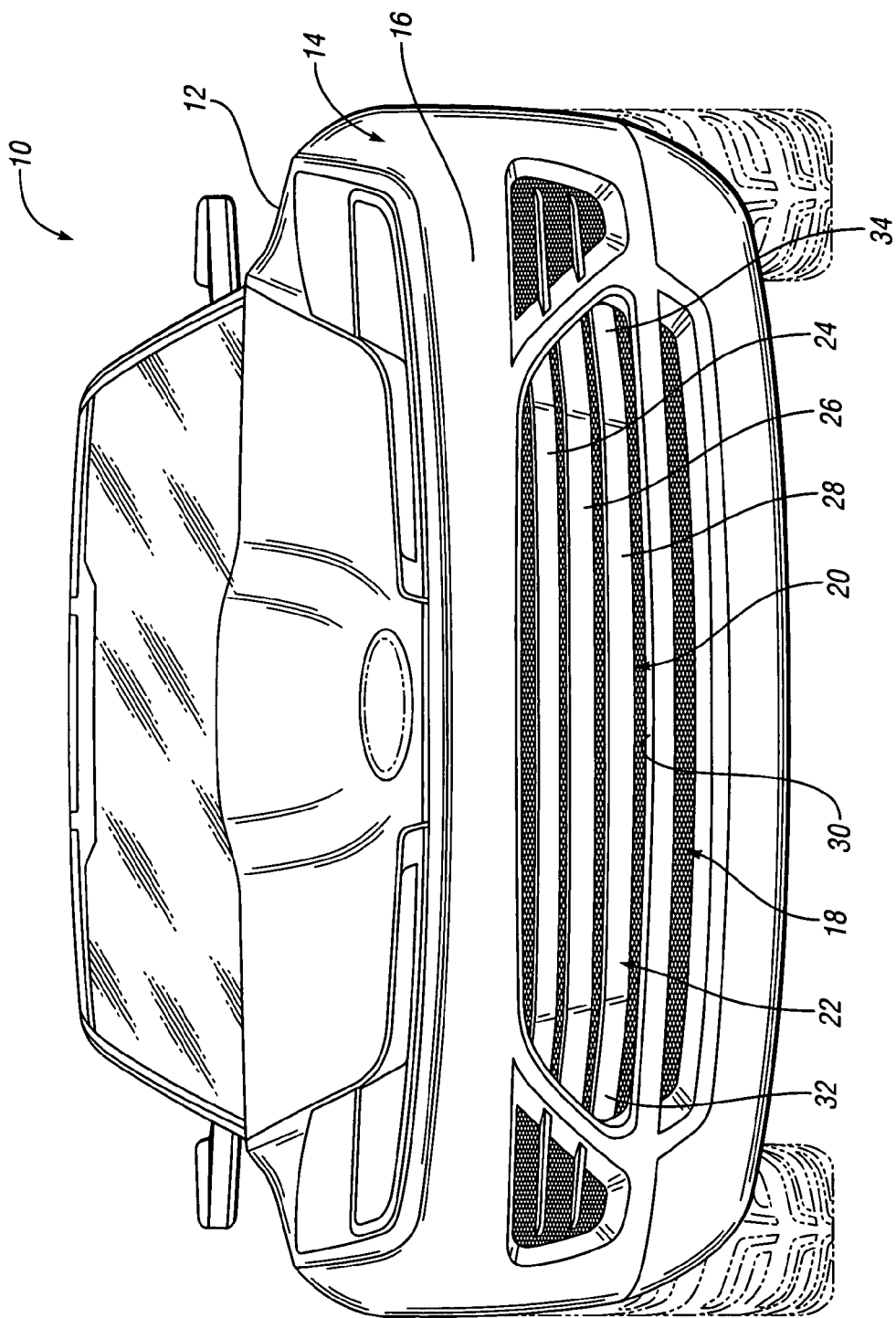
FIG. 1 is a front end elevation view of an automotive vehicle in accordance with the present invention.

Referring now to FIG. 1, an automotive vehicle is illustrated in accordance with the present invention and is referenced generally by numeral 10. The automotive vehicle 10 is illustrated as a ground vehicle having four wheels. The invention contemplates that various features of the present invention may be utilized with various automotive vehicles including passenger cars, commercial vehicles, trucks, sport utility vehicles, or the like. The vehicle 10 has a vehicle body 12 with a vehicle front end 14, which faces a forward direction of travel of the vehicle.

Figure 2:
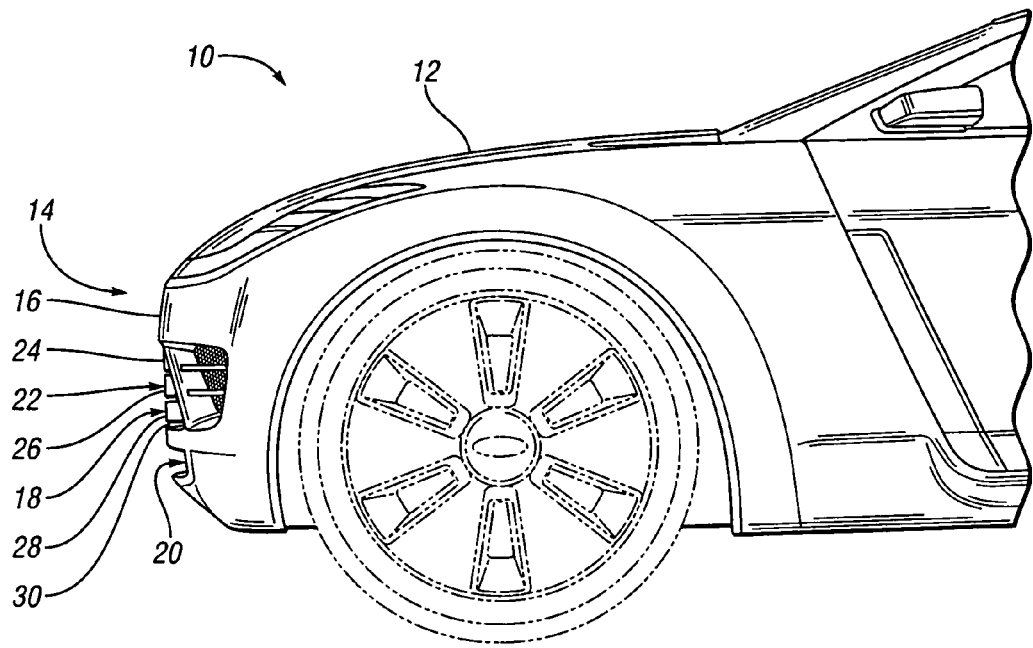
FIG. 2 is a partial left side elevation view of the automotive vehicle of FIG. 1, illustrating a front end of the vehicle.
Figure 3:
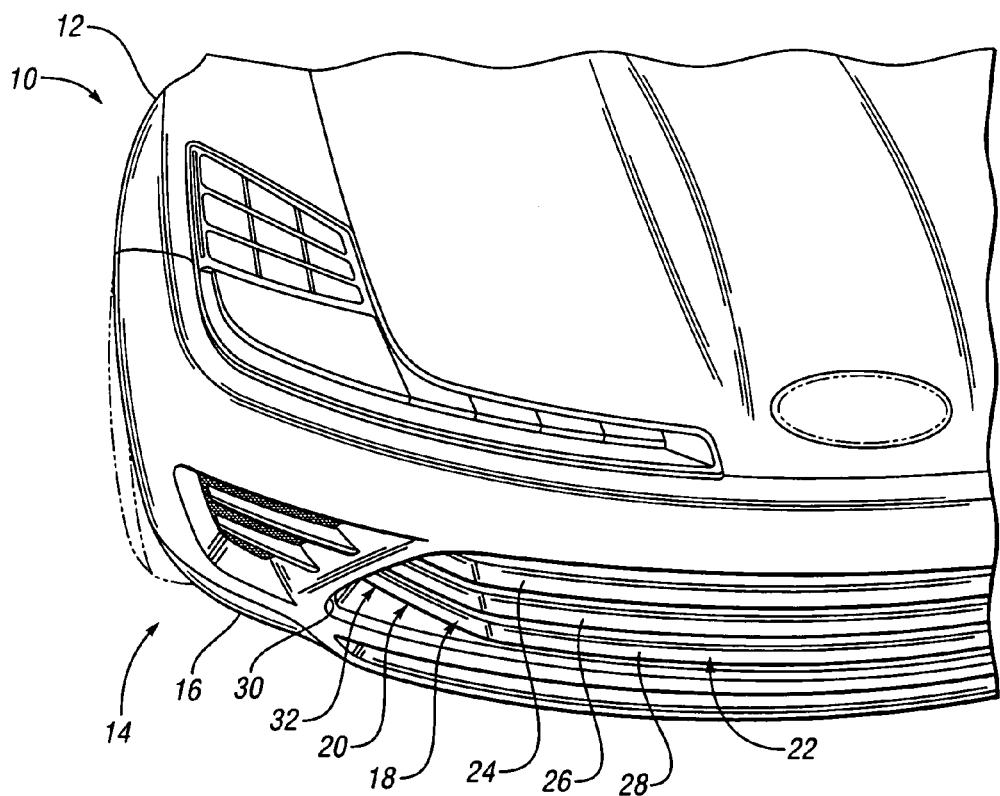
FIG. 3 is a front partial perspective view of the front end of the automotive vehicle of FIG. 1.

The vehicle front end 14 is also illustrated in FIGS. 1-3. The vehicle front end 14 includes an ornamental front end fascia 16, which encloses the front end 14 of the vehicle 10 and provides the vehicle 10 with distinctive front end styling. The front end fascia 16 includes an automotive grille 18 with an air intake 20 for permitting air to pass through the grille 18 of the front end fascia 16. The air received in the air intake 20 may be utilized for cooling a propulsion device, climate control, and for mixture with fuel, if necessary, of the propulsion device of the vehicle 10.

The vehicle front end 14 also includes a front end structural member, commonly referred to as a bumper and is depicted by reference numeral 22. The bumper 22 is provided by a series of generally horizontal bars 24, 26, 28, which extend to an exterior side of the vehicle. Although three bars 24, 26, 28 are illustrated, the invention contemplates any number or configuration of bars or other structural members for providing the bumper 22 of the vehicle 10.

By providing the structural members or bars 24, 26, 28 of the bumper 22 on the exterior side of the vehicle, the bars 24, 26, 28 are integrated into an ornamental and functional appearance of the front end fascia 16 of the vehicle 10. This arrangement provides a compact arrangement with respect to prior art vehicles wherein a structural member of the vehicle front end is commonly utilized beneath a front end fascia or bumper fascia. By exposing the structural members or bars 24, 26, 28 of the vehicle front end 14, the fascia 16 is not required to conceal the structural members 24, 26, 28. Additionally, a separate bumper fascia is not required.

Since the structural bars 24, 26, 28 of the bumper 22 form part of an ornamental appearance of the vehicle front end 14, the structural bars 24, 26, 28 may be formed from any suitable material that satisfies the structural design requirements and is ornamental or aesthetic in nature. For example, the bars 24, 26, 28 may be formed from an aluminum or stainless steel alloy and may be brushed or polished for various surface finishes.

As discussed above, by utilizing structural bars 24, 26, 28 that extend to an exterior side of the vehicle 10, the structural bars 24, 26, 28 do not require concealment behind the fascia 16. Additionally, the structural members 24, 26, 28 of the vehicle front end 14 may occupy a common region with other aesthetic or functional features of the vehicle front end 14.

For example, the embodiment of FIGS. 1-3 is illustrated with the structural bars 24, 26, 28 of the bumper 22 extending through a portion of the grille 18. Even further, the structural bars 24, 26, 28 of the bumper 22 may extend through a central aperture 30 of the air intake 20 of the grille 18. Accordingly, the structural bars 24, 26, 28 form a portion of the grille 18 by protecting the grille 18 from incidental front end impacts, such as stones, salt, insects, litter or the like. Additionally, the structural bars 24, 26, 28 protect the front end 14 of the vehicle 10 from front end impacts by collectively forming the bumper 22 of the vehicle 10. By displacing the bars 24, 26, 28 through the grille 18, the bumper 22 and grille 18 may occupy a common region, particularly at a bumper height of the vehicle 10. This feature avoids placement of the grille above the bumper, below the bumper, or above and below the bumper, which are common prior art grille/bumper arrangements.

The structural members 24, 26, 28 of the illustrated embodiment extend laterally across the vehicle 10 between first distal ends 32 and second distal ends 34 for broad front end protection of the vehicle 10. Additionally, the structural bars 24, 26, 28 are generally arcuate along a central region for providing a crumple zone to the bumper 22 while matching the contour of the vehicle front end 14.

Figure 4:
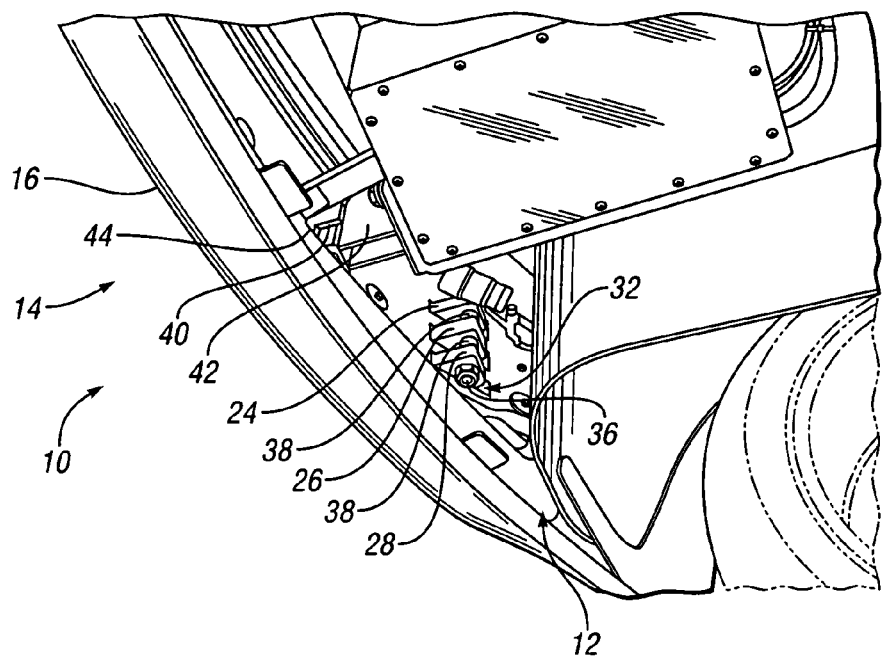
FIG. 4 is a perspective view of an underside of the front end of the vehicle of FIG. 1.
Figure 5:
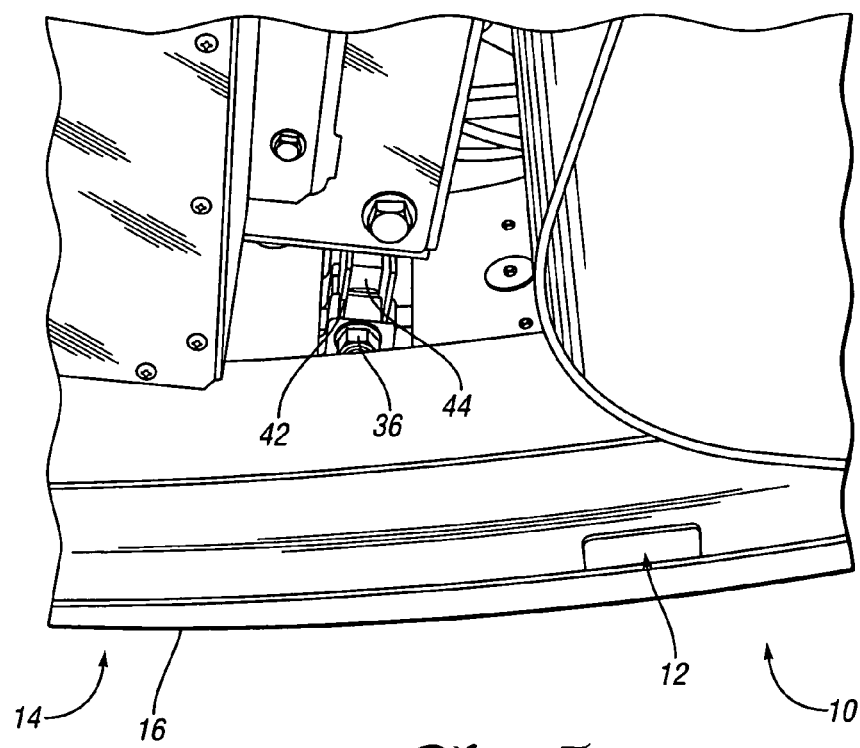
FIG. 5 is another perspective view of an underside of the front end of the automotive vehicle of FIG. 1.

Referring now to FIGS. 4 and 5, an underside of the vehicle front end 14 is illustrated, revealing an internal side of the fascia 16. In FIG. 4, the first distal ends 32 of the structural bars 24, 26, 28 are illustrated extending through the fascia 16 and terminating behind the fascia 16. Additionally, a fastener 36 is provided for fastening the distal ends 32 of the structural bars 24, 26, 28 together to form a unitary structural member. The fastener 36 is illustrated as a bolt with a threaded nut at one end, however any fastener arrangement is contemplated within the spirit and scope of the present invention. The fastener 36 further secures the distal ends 32 of the structural members 24, 26, 28 to the vehicle body 12.

Referring again to FIGS. 1-3, the structural members or bars 24, 26, 28 are stacked generally in vertical alignment with spacing therebetween. Referring back to FIGS. 4 and 5, spacers 38 are provided between adjacent distal ends 32 of the bars 24, 26, 28. For example, a spacer 38 is provided between the first distal ends 32 of the upper bar 24 and the center bar 26. Additionally, another spacer 38 is provided between the first distal ends 32 of the center bar 26 and the lower bar 28. The spacing of the bars 24, 26, 28 provides a generally streamlined appearance of the bumper 22 relative to the grille 18. Additionally, the spacing of the bars 24, 26, 28 permits air to pass through the bumper 22 so that the bumper 22 acts as both a structural member for front end impact and as a portion of the grille 18 for the air intake 20.

Although the fastener arrangements and spacers for the structural bars 24, 26, 28 are discussed with reference to the first distal ends 32, the invention contemplates that similar or same features may be provided for the second distal ends 34 of the structural bars 24, 26, 28.

Additional front end support may be provided to the bumper 22 between the distal ends 32, 34 of the structural bars 24, 26, 28. For example, the bars 24, 26, 28 may be attached to the vehicle body 12 at multiple locations along the length of the bars 24, 26, 28. As illustrated in FIGS. 4 and 5, brackets 40 may extend from the bars 24, 26, 28 through the fascia 16 for additional attachment to the vehicle body 12. The brackets 40 illustrated in FIGS. 4 and 5 extend from the bars 24, 26, 28 at locations spaced between the distal ends 32, 34 and are fastened to a frame 42 of the vehicle body 12.

The attachment of the brackets 40 of the bars 24, 26, 28 to the frame 42 may be similar to the fastener arrangement of the distal ends 32. As illustrated in FIG. 5, a fastener 36 is illustrated securing the brackets 40 to the frame 42. The attachment further includes a spacer 44 formed integral with the frame 42 for facilitating the vertically stacked and spaced alignment of the bars 24, 26, 28.

In summary, a vehicle front end is provided with functional, structural and ornamental features incorporated into an integrated fascia.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An automotive vehicle comprising:
   a vehicle body;
   an ornamental fascia mounted on a front end of the vehicle body; and
   a structural member mounted to the vehicle body front end, an exposed portion of the structural member extending through the ornamental fascia to an exterior side of the vehicle body;
   wherein the exposed portion of the structural member extends laterally across the front end of the vehicle body.

2. The automotive vehicle of claim 1 wherein the ornamental fascia further comprises a grille.

3. The automotive vehicle of claim 1 wherein the structural member is provided for absorbing front end impacts.

4. The automotive vehicle of claim 1 wherein the structural member is formed from an aluminum alloy.

5. The automotive vehicle of claim 1 wherein the structural member exposed portion further comprises at least two generally horizontal bars aligned vertically with spacing between adjacent bars.

6. The automotive vehicle of claim 1 wherein the structural member is at least partially arcuate along the length of the structural member.

7. The automotive vehicle of claim 1 wherein the ornamental fascia flirt her comprises an air intake.

8. The automotive vehicle of claim 7 wherein the structural member exposed portion extends through the air intake.

9. The automotive vehicle of claim 1 wherein the structural member further comprises a plurality of structural members each having an exposed portion extending through the ornamental fascia to an exterior side of the vehicle body.

10. The automotive vehicle of claim 9 wherein the ornamental fascia further comprises an air intake, the exposed portions of the structural members extend through the air intake and the structural members are spaced relative to each other to permit air to pass between the structural members.

11. The automotive vehicle of claim 1 wherein the structural member further comprises a plurality of structural members each having a first distal end, a second laterally spaced distal end, and an intermediate portion, the intermediate portion extending through the ornamental fascia to the exterior side of the vehicle body.

12. The automotive vehicle of claim 11 wherein the structural member first distal ends are fastened together beneath the ornamental fascia and the structural member second distal ends are fastened together beneath the ornamental fascia.

13. The automotive vehicle of claim 12 wherein the intermediate portion of the structural members are stacked vertically and spaced apart by spacers disposed between the distal ends.

14. The automotive vehicle of claim 1 wherein the structural member includes a pair of laterally apart distal ends.

15. The automotive vehicle of claim 14 wherein the structural member is mounted to a frame of the vehicle body.

16. The automotive vehicle of claim 14 wherein the structural member is mounted to the vehicle body.

17. The automotive vehicle of claim 16 wherein the structural member is mounted to the vehicle body along the length of the structural member at a location disposed between the structural member distal ends.

18. The automotive vehicle of claim 1 wherein the ornamental fascia further comprises a grille mounted to the vehicle body front end with an air intake for receiving air for the automotive vehicle; and wherein the structural member further comprises a structural bumper mounted to the vehicle front end extending through the grille air intake.

19. An automotive vehicle comprising:

a vehicle body;

an ornamental fascia mounted on a front end of the vehicle body; and a structural member mounted to the vehicle body front end, an exposed portion of the structural member extending through the ornamental fascia to an exterior side of the vehicle body;

wherein the structural member exposed portion further comprises at least two generally horizontal bars aligned vertically with spacing between adjacent bars.

* * * * *